March 17, 1964 P. J. CELANO ETAL 3,124,835
LAMINATING APPARATUS
Filed Dec. 14, 1961 2 Sheets-Sheet 1

INVENTORS
PETER J. CELANO
EMIL G. MARCMANN
BY
Arthur H. Seidel
ATTORNEY

March 17, 1964 P. J. CELANO ETAL 3,124,835
LAMINATING APPARATUS
Filed Dec. 14, 1961 2 Sheets-Sheet 2

INVENTORS.
PETER J. CELANO
EMIL G. MARCMANN
BY
Arthur H. Seidel
ATTORNEY

United States Patent Office 3,124,835
Patented Mar. 17, 1964

3,124,835
LAMINATING APPARATUS
Peter J. Celano, Laurel Springs, N.J., and Emil G. Marcmann, Collegeville, Pa., assignors to United Foam & Plastics Industries, Barrington, N.J., a corporation of New Jersey
Filed Dec. 14, 1961, Ser. No. 159,290
6 Claims. (Cl. 18—4)

This invention relates to a laminating apparatus, and more particularly, to a laminating apparatus for the continuous manufacture of sheets of rigid material having a layer of foam polymeric resin thereon.

The laminating apparatus of the present invention is of the type which produces sheets of plywood or other rigid material having a layer of foam polymeric material on one surface thereof. Heretofore, no apparatus was commercially available for manufacturing laminated materials of this nature on a continuous production line basis. In providing an apparatus capable of functioning in this manner, I provide a conveying apparatus which grips sheets of rigid material along side edges thereof for processing the same beneath a dispensing nozzle and heater lamps for curing the resin.

The conveyor apparatus is in the nature of a pair of spaced parallel endless belts. The outer layer of the belts which grip the edges of the sheets of rigid material are coated with a material such as Teflon which will not adhere to the layer of foam polymeric resin on the sheets of material. Each of the endless belts are structurally interrelated with a drive and support mechanism which enables the belts to move toward or away from each other to accommodate slight variations in the dimensions of the sheets of material being coated.

It is an object of the present invention to provide a novel laminating apparatus.

It is another object of the present invention to provide a novel laminating apparatus capable of producing sheets of rigid material with a layer of foam polymeric resin thereon on a continuous production line basis.

It is another object of the present invention to provide a novel laminating apparatus wherein the article to be coated is conveyed by being gripped along side edges thereof so that one entire surface may be coated.

It is another object of the present invention to provide a laminating apparatus which automatically compensates for slight variations in the width of the articles to be coated.

It is still another object of the present invention to provide a laminating apparatus which may act as a continuous three dimensional mold by which configuration of width and depth of an indefinite length of material may be controlled.

Other objects will appear hereinafter.

For the purpose of illustrating the invention there is shown in the drawings a form which is presently preferred; it being understood, however, that this invention is not limited to the precise arrangements and instrumentalities shown.

Referring to the drawing in detail, wherein like numerals indicate like elements, there is shown in FIGURE 1 a laminating apparatus designated generally as 10.

Figure 1:
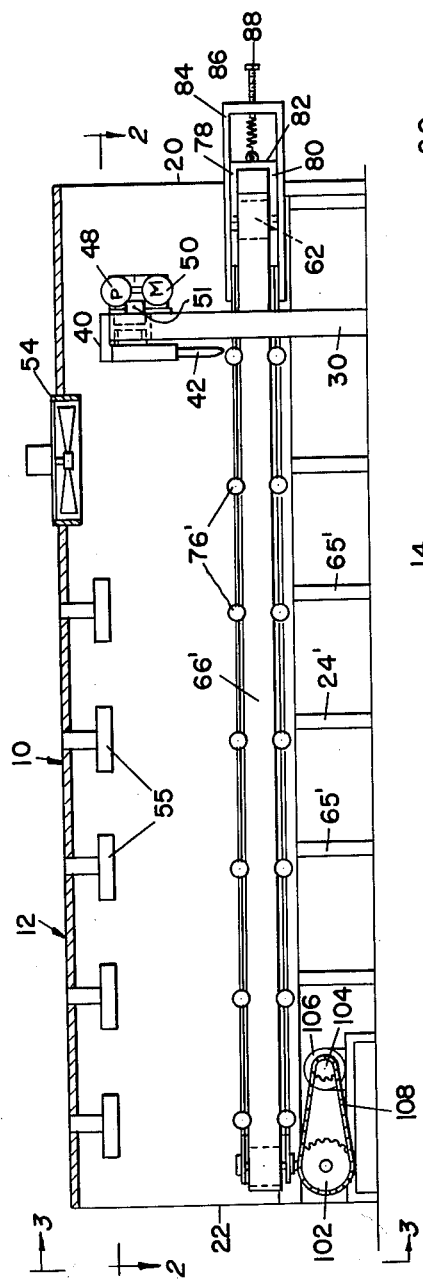
FIGURE 1 is a side elevation view of the apparatus of the present invention.

The apparatus 10 includes a housing 12 having spaced parallel side walls 14 and 16 interconnected at their upper edges by a top wall or ceiling 18. The housing 12 is provided with an inlet end 20 and an outlet end 22. The housing 12 is supported on a convenient surface such as the floor of a building or the like.

A frame 24 is disposed within the housing 12. The frame 24 extends along the full length of the housing 12 and is spaced inwardly from the side walls 14 and 16. A plurality of horizontally disposed rollers 26 are supported at spaced points along the length of the frame 24.

Figure 2:
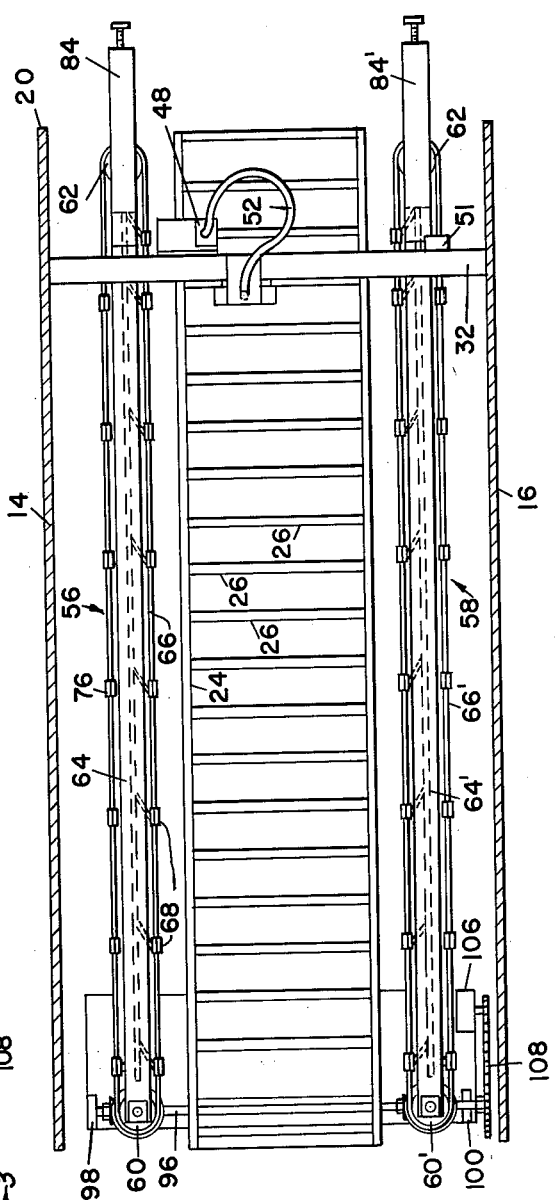
FIGURE 2 is a longitudinal sectional view taken along the lines 2—2 in FIGURE 1.
Figure 3:
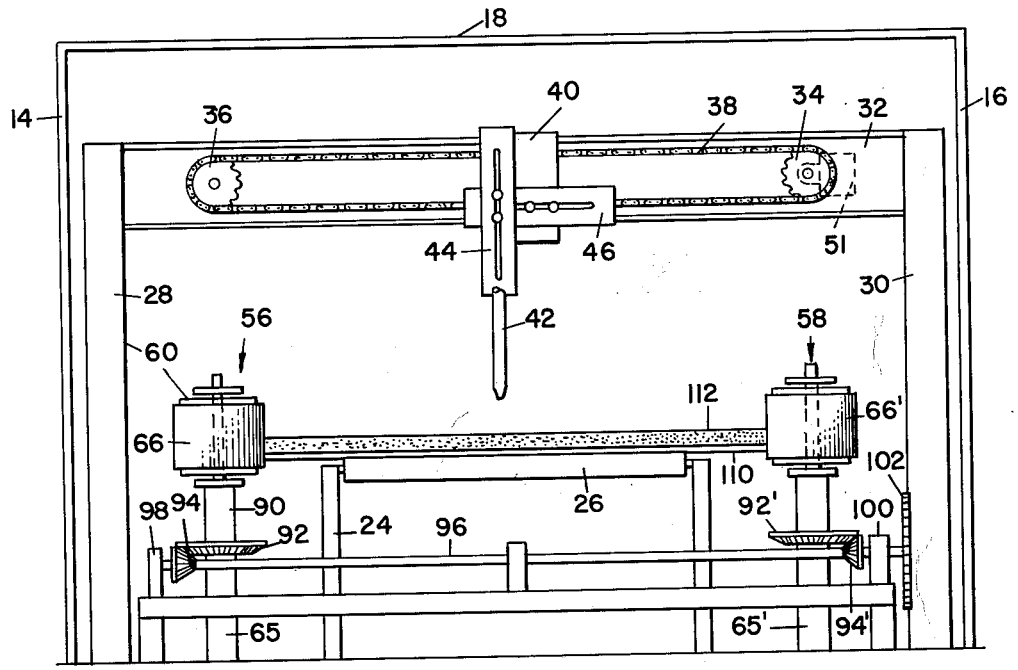
FIGURE 3 is an end elevation view taken along the lines 3—3 in FIGURE 1.

As shown more clearly in FIGURE 3, a column 28 is supported in an upright position adjacent the wall 14. A column 30 is supported in an upright position adjacent the wall 16. As shown more clearly in FIGURE 2, the columns 28 and 30 are disposed adjacent the inlet end 20. A horizontal support 32 extends across the upper end of the columns 28 and 30. The support 32 is a rigid member such as an I-beam or the like.

The support 32 has a pair of sprockets 34 and 36 rotatably supported thereon as shown more clearly in FIGURE 3. An endless chain 38 extends around the sprockets 34 and 36. A carriage 40 is reciprocably supported by the support 32 and is driven by the chain 38.

The carriage 40 supports a nozzle 42 extending downwardly therefrom toward the rollers 26. The nozzle 42 is provided with a support plate 44 to accommodate vertical adjustment and a support plate 46 to accommodate horizontal adjustment. A pump 48 may be supported by the horizontal support 32 or in any convenient place. The outlet side of the pump 48 is connected to the nozzle 42 by means of a flexible hose 52. The pump 48 will be driven by the motor 50 mounted adjacent thereto.

The sprocket 34 is a drive sprocket. The shaft which rotatably supports the sprocket 34 is mechanically rotated by means of a motor 51. The motor 51 is a reversible motor suitably interconnected so that it automatically reverses itself after a predetermined number of turns. The rotation of the sprocket 34 in alternate directions causes the chain 38 to reciprocate the carriage 40 back and forth across the central portion of the housing 12.

The top wall of the housing 12 supports an exhaust fan 54 adjacent the inlet end 20. As shown more clearly in FIGURE 1, the fan 54 is disposed so as to be slightly closer to the outlet end 22 of the housing 12 than the nozzle 42. The top wall 18 also supports a plurality of infrared heat lamps 55 disposed at spaced points therealong above the rollers 26. The lamps 55 direct heat toward the rollers 26 for a purpose to be made clear hereinafter.

A belt drive means 56 extends along wall 14. A belt drive means 58 extends along the wall 16. The belt drive means 56 and 58 are parallel to one another and are identical. Accordingly, it is deemed to be sufficient for the purposes of the present disclosure to explain only belt drive means 56 in detail. Comparable structure on the belt drive means 58 will be indicated in the drawing with primed numerals.

Figure 4:
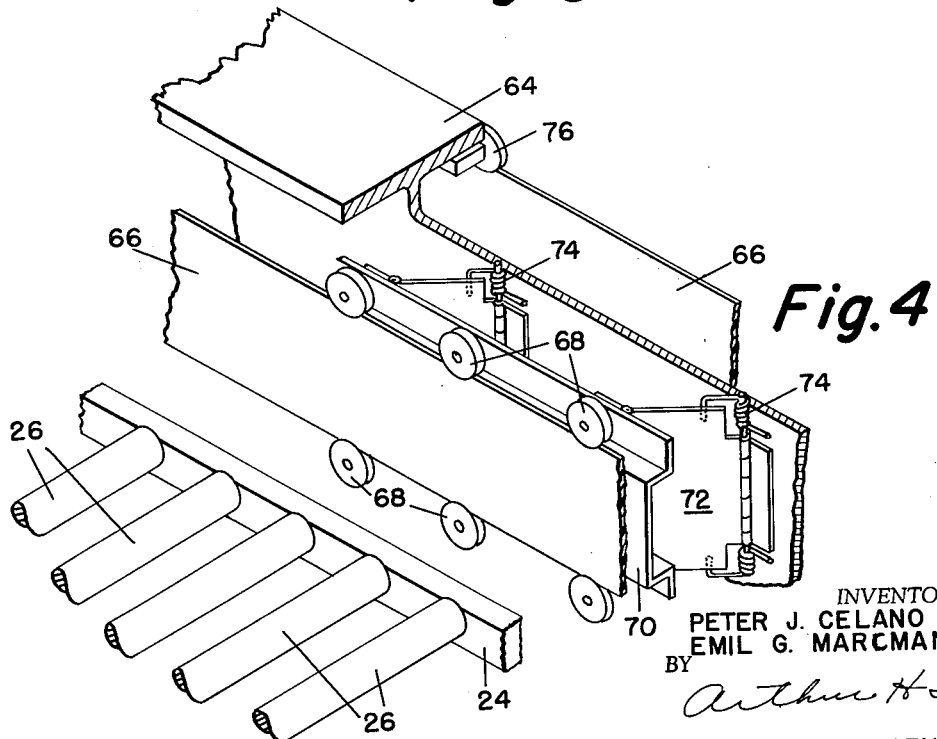
FIGURE 4 is a partial perspective view of a belt drive means, with elements broken away for purposes of clarity.

The belt drive means 56 includes a drive roller 60 adjacent the outlet end 22 and an idler roller 62 adjacent the inlet end 20. The rollers 60 and 62 are mounted for rotation about an upright axis. As shown more clearly in FIGURE 4, an I-beam 64 forms an integral part of the belt drive means 56. An endless belt 66 extends around the rollers 60 and 62. The belt 66 extends in a plane spaced from an substantially parallel to the web of the I-beam 64. The belt 66 is perferably laminar in structure. The outermost layer of the belt 66 is provided with a coating of material such as Teflon.

The portion of the belt 56 adjacent the frame 24 has its side edges supported by means of guide sheaves 68. The sheaves 68 are rotatably supported by a plate 70 having a central portion juxtaposed to and supporting a central portion of the belt 56. The plate 70 is interconnected with the web of the I-beam 64 at spaced points therealong by means of hinges 72. The hinges 72 are biased by torsion springs 74 toward a position wherein the hinges 72 would be substantially perpendicular to the web portion of the I-beam 64. As a result of the spring biased hinges 72, the plate 70 and the portion of the belt 66 adjacent the frame 24 may move toward or away from the wall 14 of the housing 12, thereby automatically accommodating to the variations in the widths of the articles to be coated.

The portion of the belt 66 adjacent the wall 14 of the housing 12 has its side edges supported by sheaves 76. The sheaves 76 are rotatably supported by members extending from the upper and lower flange portions of the I-beam 64. As shown more clearly in FIGURE 1, the axle of the rollers 62 is interconnected with a pair of parallel arms 78 and 80. The arms 78 and 80 are interconnected by an arm 82. The arms 78—82 are supported by a C-shaped frame 84 extending from one end of the I-beam 64. The arm 82 is biased to the right in FIGURE 1 by means of coil spring 86. The spring 86 is connected to one end of a threaded rod 88 extending through a portion of the frame 84. By adjusting the threaded rod 88, the tension of the belt 66 may be selectively varied.

As shown more clearly in FIGURE 3, the drive roller 60 is rotatably supported by an upright shaft 90. The lower end of the shaft 90 terminates in a horizontally disposed beveled gear 92. The gear 92 is meshingly engaged with a beveled gear 94. The gear 94 is keyed to a horizontally disposed drive shaft 96. The drive shaft 96 is rotatably supported at its ends by bearing supports 98 and 100.

As shown more clearly in FIGURES 2 and 3, the end of the shaft 96 adjacent the bearing support 100 terminates in a sprocket 102. A motor 106 having a sprocket 104 is supported between the wall 16 of the housing 12 and the belt drive means 58. A chain 108 extends around the sprockets 102 and 104.

The I-beam 64 is supported at spaced points therealong by a plurality of spaced upright support members 65. If desired, the upright support members 65 may be interconnected for adjustment toward and away from the frame 24. Likewise, the beveled gear 94 may be removably secured to the shaft 96 for movement therealong as desired. In this manner, the entire drive means 56 may be moved toward or away from the drive means 58.

The operation of the apparatus 10 is as follows:

Articles to be coated, such as sheets of plywood 110, are conveniently fed onto the rollers 26 from the inlet end 20 of the housing 12. Suitable dispensing apparatus is commercially available for selectively feeding individual sheets of material from a stack thereof. The sheet of plywood 110 is disposed on the rollers 26 so that the belts 66 and 66' are in abutting engagement wtih side edges thereof. The leading edge of the sheet of plywood 110 is disposed beneath the nozzle 42.

At this point, operation of motors 50, 51, 106 will be initiated. Fan 54 and lamps 55 will be turned on. Operation of motor 51 causes the carriage 40 to reciprocate back and forth across the width of the sheet of plywood 110. Motor 50 causes the pump 48 to pump liquefied foam polymeric resin such as foam polyurethane through conduit 52 to the nozzle 42. The nozzle 42 disperses the same onto the sheet of plywood 110.

The Teflon coating on the belts 66 and 66' prevents the polymeric resin from adhering thereto. In this manner, a layer of foam polymeric resin 112 may be provided across the full width of the sheet of plywood 110. While the nozzle 42 is caused to reciprocate back and forth across the width of the sheet of plywood 110, motor 106 rotates drive roller 60 in a clockwise direction and drive roller 60' in a counter clockwise direction in FIGURE 2. Such rotation of the rollers 60 and 60' causes the belts 66 and 66' to move the sheet of plywood 110 from the inlet end 20 to the outlet end 22 of the housing 12. The fumes resulting from the spraying of foam polymeric resin on the sheet of plywood 110 are removed through the top wall 18 of the housing 12 by means of the fan 54. As the sheet of plywood 110 is conveyed toward the outlet end 22, the layer of foam polymeric resin 112 is curved by the infrared heat lamps 55. A suitable conveying apparatus will be provided adjacent the outlet end 22 of the housing 12 to receive the coated panels. The spring bias on the portions of the belts 66 and 66' which are in engagement with the side edges of the plywood sheets 110 enables the belts to accommodate to various changes in the widths of the sheets 110. The provision of an automatic feeding mechanism for the plywood sheets 110 and the provision of a conveyor apparatus to receive the same adjacent the outlet end 22 of the housing 12, facilitates the automatic manufacture of laminated rigid panels on a production line basis with the apparatus 10 of the present invention.

It will be appreciated that equivalent structure may be substituted for the elements which cause the nozzle 42 to reciprocate back and forth across the width of the panel or sheet of material being coated. For example, a manifold may be provided which would extend across the full width of the sheet of material being coated. Hence, the nozzle 42 need not reciprocate. It is within the scope of the present invention to provide equivalent conveyor means for causing the sheet of material being coated to move from the inlet end 20 of the housing 12 to the outlet end 22. While the present invention has been illustrated in connection with the provision of a layer of foam polymeric resin 112 on a plywood sheet 110, it will be appreciated that the apparatus of the present invention may be utilized to provide other types of coatings on any one of a wide variety of sheets of rigid material.

In operation, the apparatus 10 has produced laminated panels 4' x 8' at the rate of approximately thirty per hour when using foam polyurethane as the coating material. The lamps 55 may be thermostatically controlled to provide even heat for curing the foam resin.

The thickness of the layer 112 is controlled by varying the dispensing rate of the nozzle 42 and/or the rate of travel of the belts 66 and 66'. The layer 112 may be any thickness up to 4" and sheet of material 110 may be any thickness including a foil. The cured layer 112 of foam resin will be bonded to the material 110. The laminated panels produced by the apparatus 10 are particularly adapted for use as insulation panels. It will be obvious that precoated panels may be provided with a second coating by the apparatus 10.

It will be obvious to those skilled in the art that the apparatus 10 acts as a continuous three dimensional mold by which the width and depth of an indefinite length of substrate may be coated. As illustrated, the belts will cause the foam resin to have a side edge which is coextensive with the substrate sheet of material 110. Thus, the side edge of the foam resin will be perpendicular to the plane of the substrate sheet of material 110. The shape of the edge of the foam resin may be varied by varying the shape of the surface of the belts immediately above the portion of the belts which engage the side edges of the substrate material 110.

The present invention may be embodied in other specific forms without departing from the spirit or essential attributes thereof and, accordingly, reference should be made to the appended claims, rather than to the foregoing specification as indicating the scope of the invention.

We claim:

1. Apparatus comprising a plurality of horizontally disposed rollers for supporting sheets of rigid material, a belt drive means on opposite sides of said rollers for engaging a side edge of the sheets of rigid material and moving the same along said rollers, a nozzle above said rollers for dispensing a liquefied foam polymeric resin on said sheets of rigid material, said belt drive means being adapted to cooperate with the sheets of rigid material to simulate a mold capable of providing a predetermined shape for the side edges of the foam resin, and heat means above said rollers for curing the polymeric resin into a layer of foam bonded to the sheets of rigid material.

2. Apparatus comprising: conveyor means for mechanically moving sheets of rigid material past a means for dispensing a coating of material on said sheets of rigid material, said conveyor means including means for supporting said sheets, flexible belt means extending along one side of the supporting means for engaging a side edge of the sheets of rigid material and moving the same along said support means, means extending along the other side of the support means for maintaining the sheets on the support means in engagement with said belt means as they are moved, said belt means extending around a pair of rollers, and resilient means in contact with said belt means intermediate said rollers for moving said belt means toward and away from said support means in response to variations in the width of said sheets.

3. Apparatus in accordance with claim 2 including means supporting sheaves, said sheaves being in rolling engagement with a side edge of said belt means.

4. Apparatus in accordance with claim 1 including a housing having a top wall over said rollers, and an exhaust fan in said top wall.

5. Apparatus in accordance with claim 1 wherein said belts have an exposed layer which does not readily adhere to the foam polymeric resin adapted to be dispensed by said nozzle, said exposed layer being placed contiguous with said rigid material and said foam resin to simulate a mold for the side edges of the foam resin.

6. The apparatus of claim 2 wherein said support means includes a frame supporting a plurality of spaced parallel rollers disposed in a horizontal plane and said belt means is vertically positioned along one side edge of said frame to drive said sheets of material.

References Cited in the file of this patent

UNITED STATES PATENTS

| | | |
|---|---|---|
| 1,358,431 | Field | Nov. 9, 1920 |
| 2,316,173 | Kratz | Apr. 13, 1943 |
| 2,441,235 | Blair et al. | May 11, 1948 |
| 2,841,205 | Bird | July 1, 1958 |
| 2,847,701 | Welch | Aug. 19, 1958 |
| 2,866,730 | Potchen et al. | Dec. 30, 1958 |
| 2,912,738 | Bergling et al. | Nov. 17, 1959 |
| 2,929,793 | Hirsh | Mar. 22, 1960 |
| 2,950,221 | Bauer et al. | Aug. 23, 1960 |
| 2,998,841 | Rowe | Sept. 5, 1961 |
| 3,037,242 | Eudier | June 5, 1962 |